United States Patent [19]

Tanabe et al.

[11] Patent Number: 4,961,784
[45] Date of Patent: Oct. 9, 1990

[54] METHOD OF SMELTING REDUCTION OF CHROMIUM RAW MATERIALS AND A SMELTING REDUCTION FURNACE THEREOF

[75] Inventors: Haruyoshi Tanabe; Masahiro Kawakami; Kenji Takahashi; Katsuhiro Iwasaki; Shigeru Inoue, all of Tokyo, Japan

[73] Assignee: NKK Corporation, Tokyo, Japan

[21] Appl. No.: 360,916

[22] PCT Filed: Aug. 11, 1988

[86] PCT No.: PCT/JP88/00800

§ 371 Date: Apr. 13, 1989

§ 102(e) Date: Apr. 13, 1989

[87] PCT Pub. No.: WO89/01532

PCT Pub. Date: Feb. 23, 1989

[30] Foreign Application Priority Data

Aug. 13, 1987 [JP] Japan .................. 87/201002
Dec. 26, 1987 [JP] Japan .................. 87/330977
Dec. 26, 1987 [JP] Japan .................. 87/330980

[51] Int. Cl.$^5$ .................................. C22B 34/00
[52] U.S. Cl. ........................... 75/623; 75/708
[58] Field of Search ..................... 75/623, 708

[56] References Cited

U.S. PATENT DOCUMENTS 4,130,417 12/1978 Breuer et al. .................. 75/623
4,783,219 11/1988 Mori et al. .................... 75/623

Primary Examiner—Stephen J. Lechert, Jr.
Assistant Examiner—Leon Nigohosian, Jr.
Attorney, Agent, or Firm—Moonray Kojima

[57] ABSTRACT

The present invention relates to a method of carrying out a smelting reduction of Cr raw material as Cr ores, Cr ore pellets and so on for directly producing high Cr molten metal in a furnace provided with bottom gas blowing tuyeres, side gas blowing tuyere and a top blowing lance. An inert gas is blown from the bottom tuyere to form an upheaving part on the surface of the molten metal in a furnace provided with bottom gas tuyere against the upheaving part, whereby the molten metal is diffused into a region of the slag where Cr raw material fly so as to accelerate reduction of Cr raw materials by C in the molten metal. On the other hand, $O_2$ for decarburization is blown from the top lance into the molten metal, and at the same time $O_2$ for a post combustion is blown into the slag, whereby a region post combustion is formed mainly in the slag, and the slag is agitated compulsively by gas blown from the side tuyere so that heat caused by the post combustion is transferred to Cr ores at high heat transfer efficiency. A ratio of the post combustion is maintained to be more than 0.3 for securing a high post combustion.

6 Claims, 15 Drawing Sheets

FIG_1
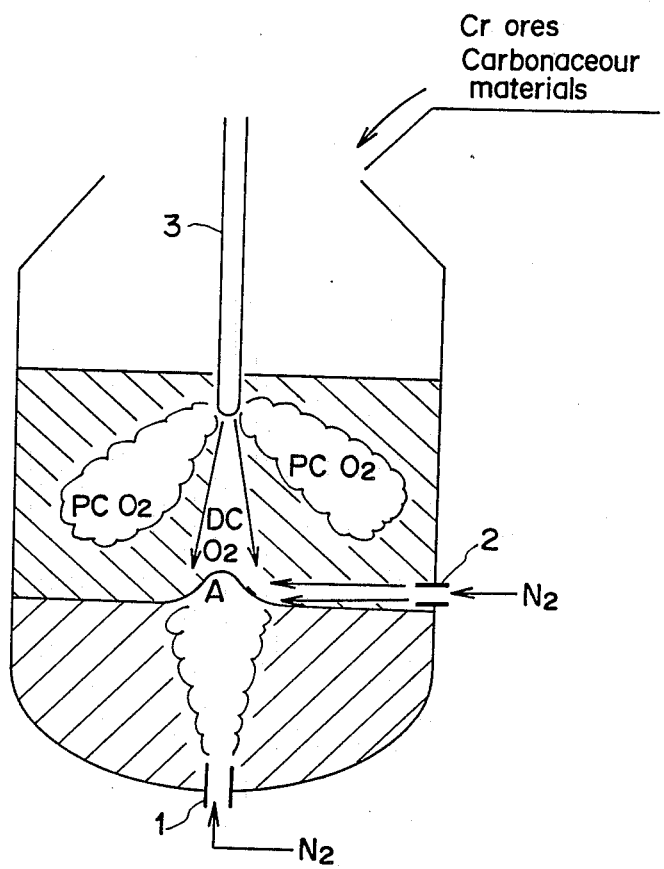
PC O2 : O2 for post combustion
DC O2 : O2 for decarburizaion

FIG_2
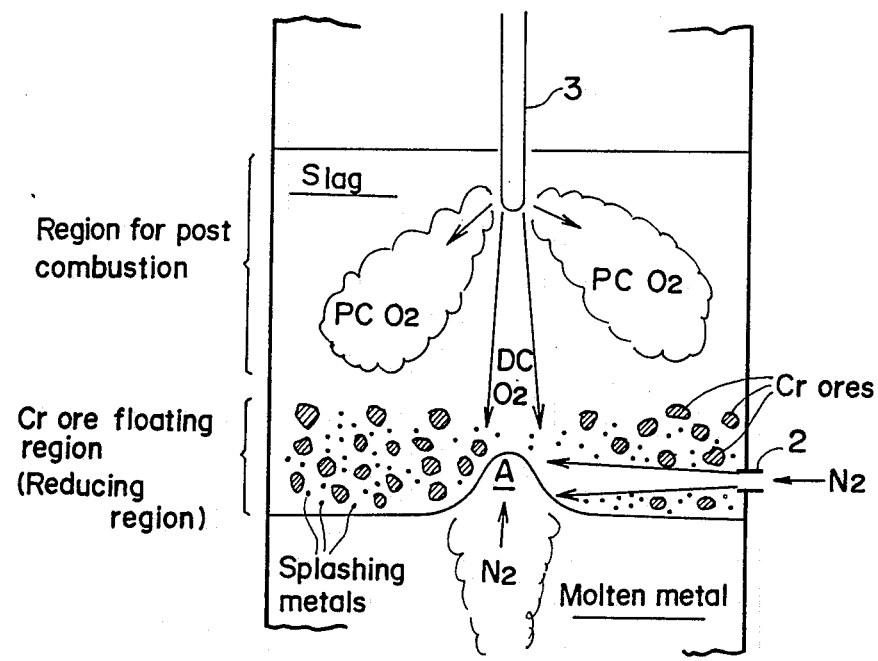
FIG_3 (a)
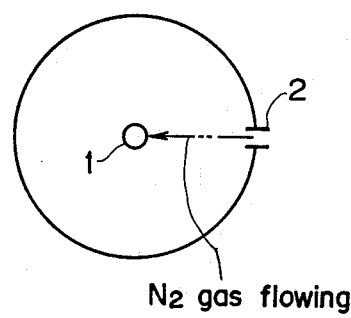
FIG_3 (b)
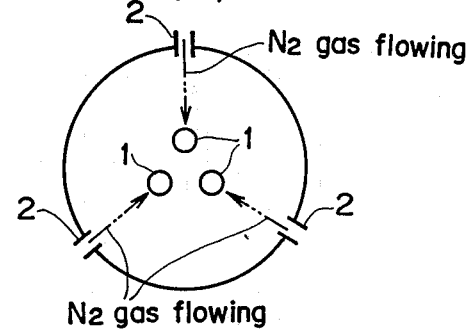

FIG_4
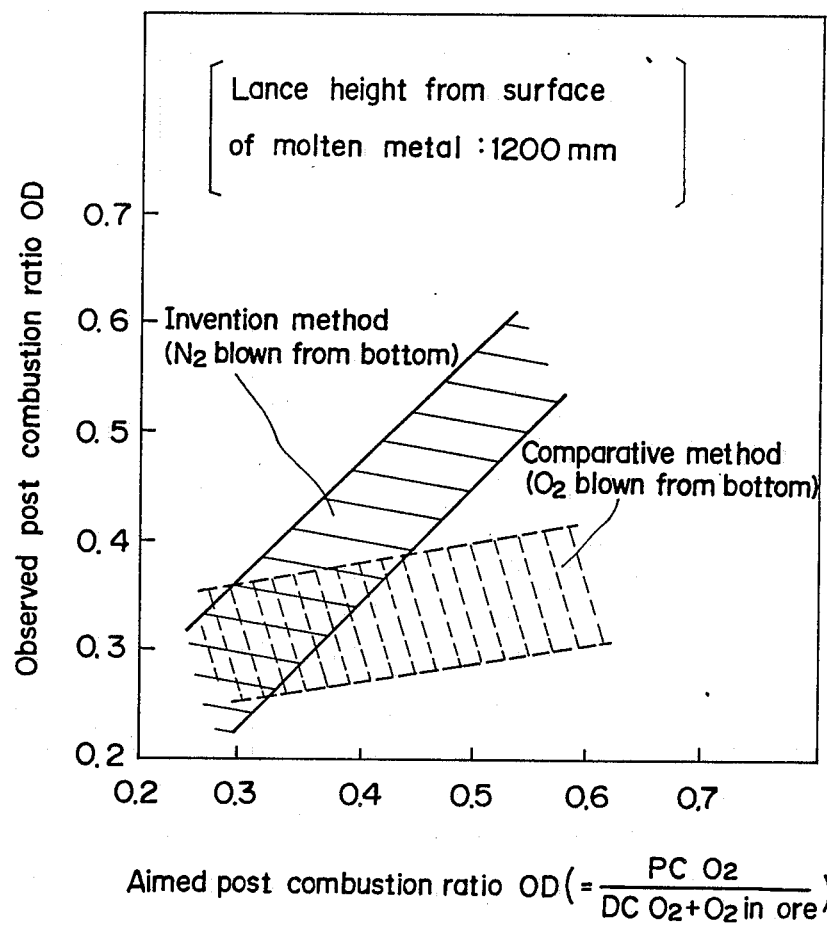
Aimed post combustion ratio $OD \left( = \dfrac{PC\ O_2}{DC\ O_2 + O_2\ \text{in ore}} \right)$

FIG_5
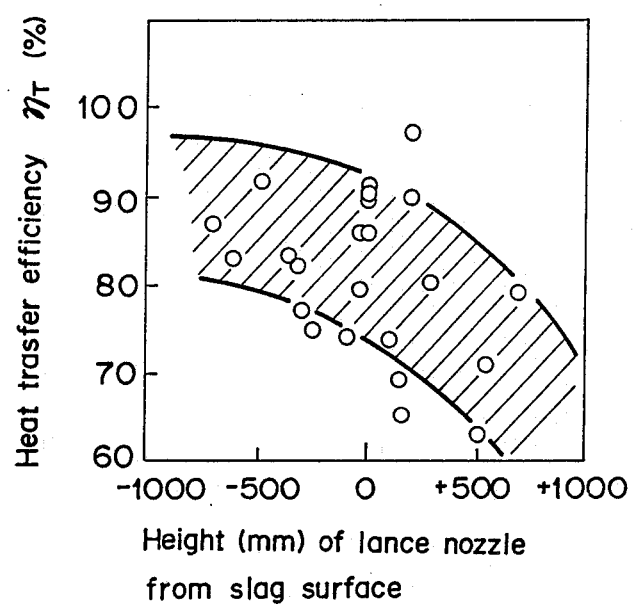
FIG_6
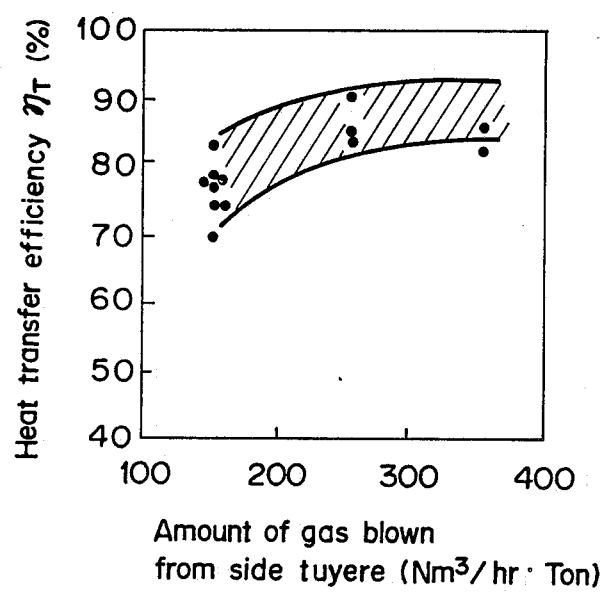

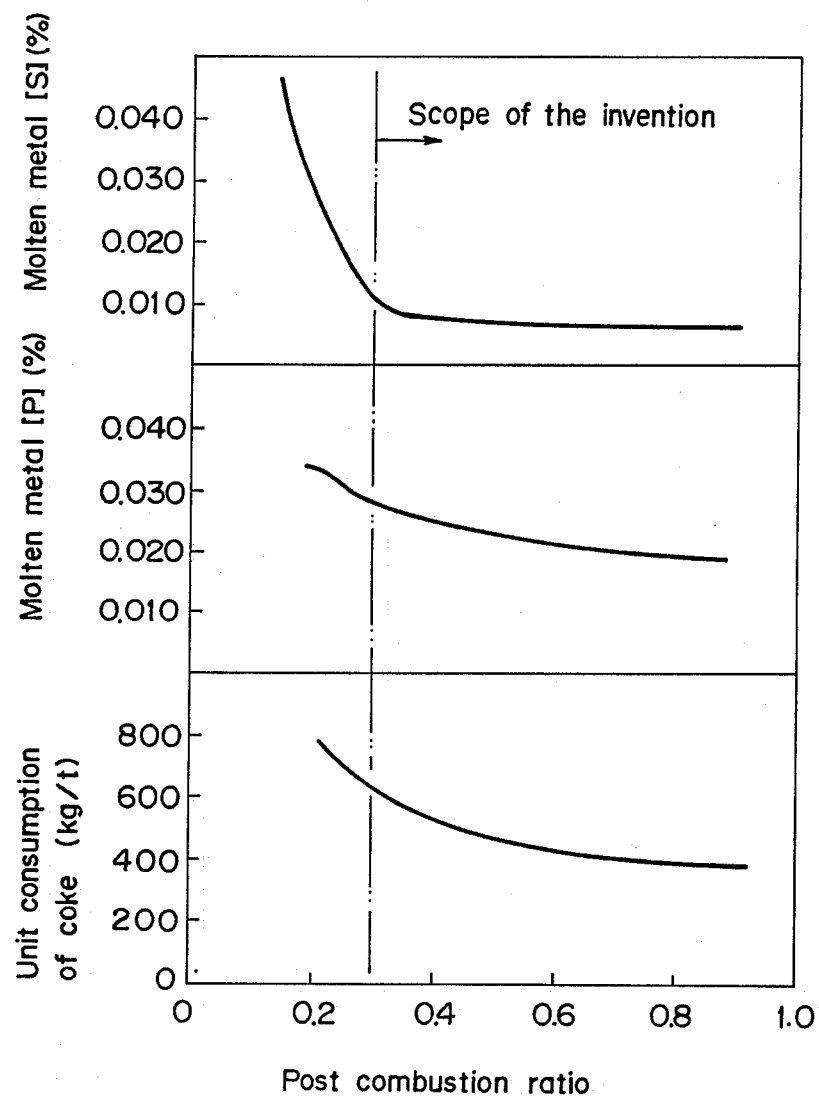
FIG_7

FIG_8
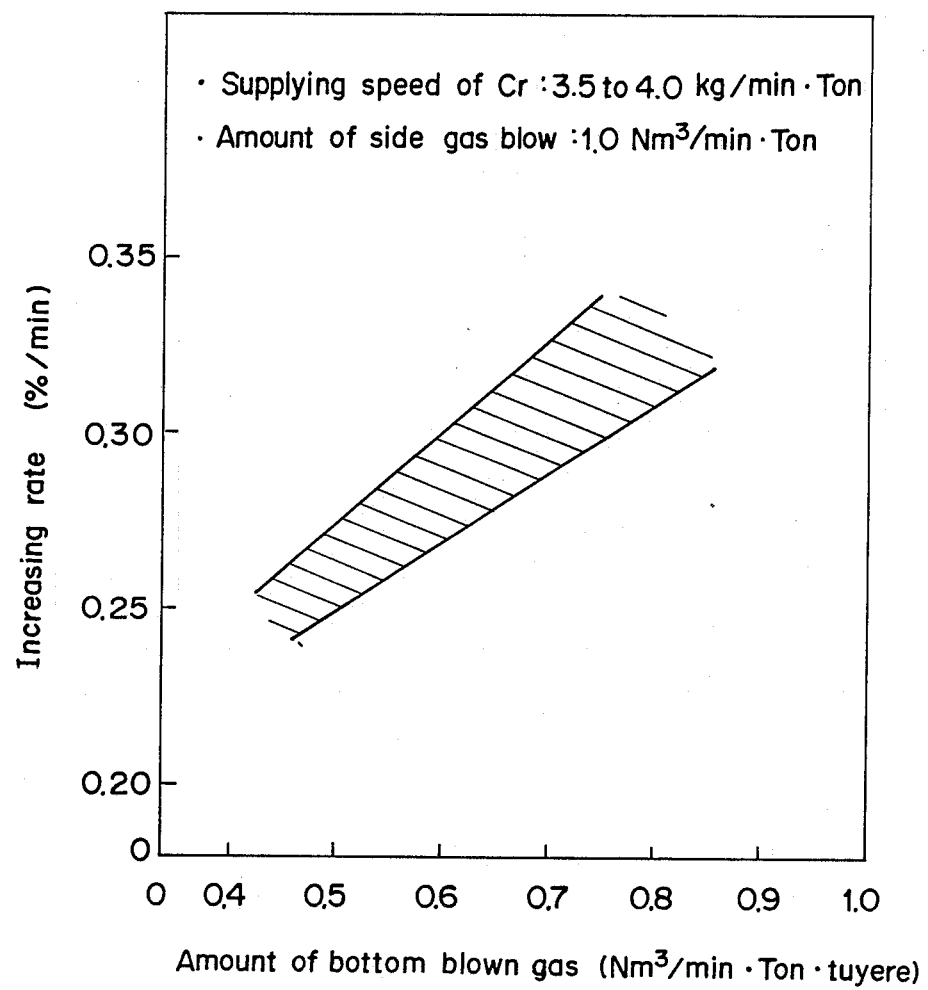

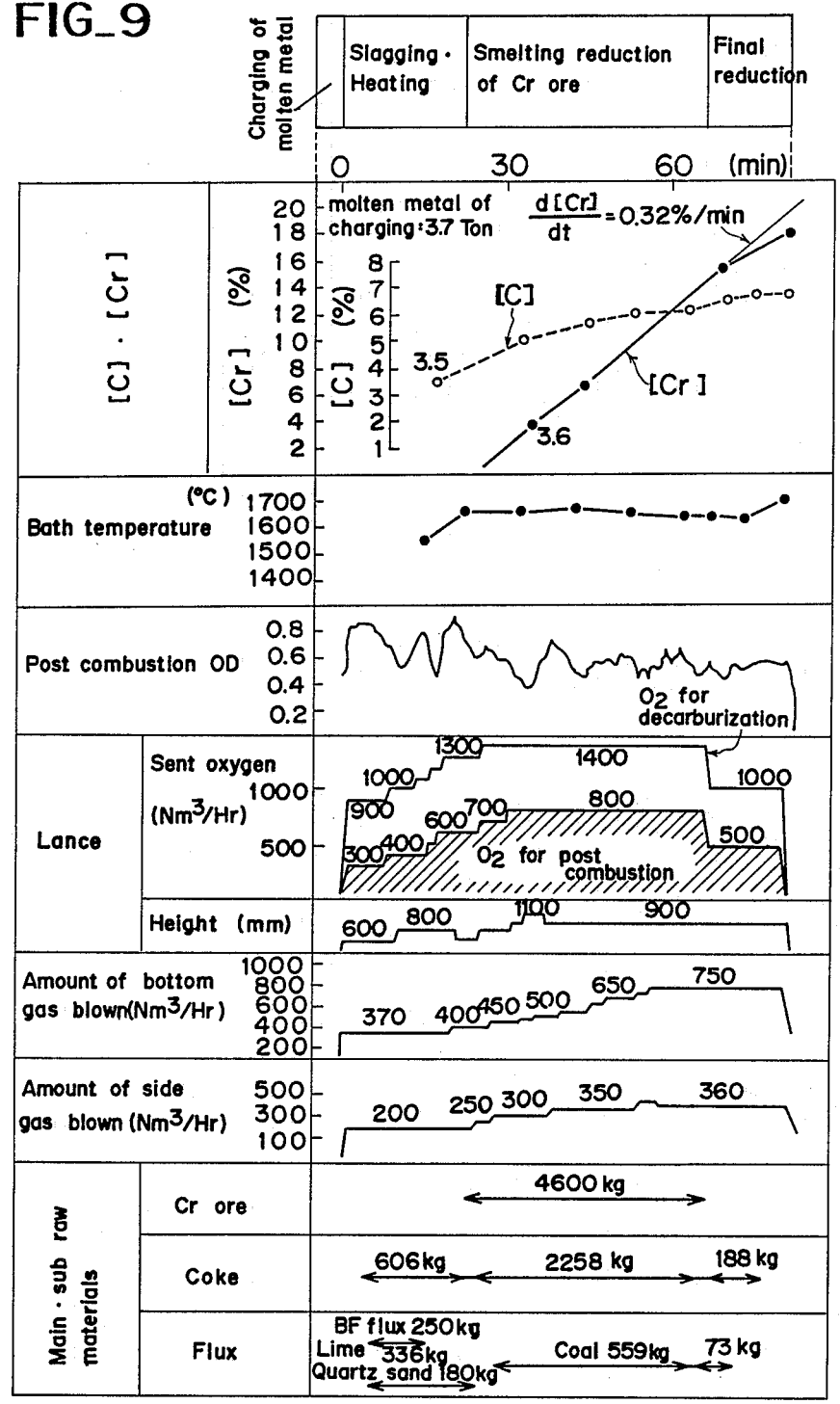
FIG_9

FIG_10
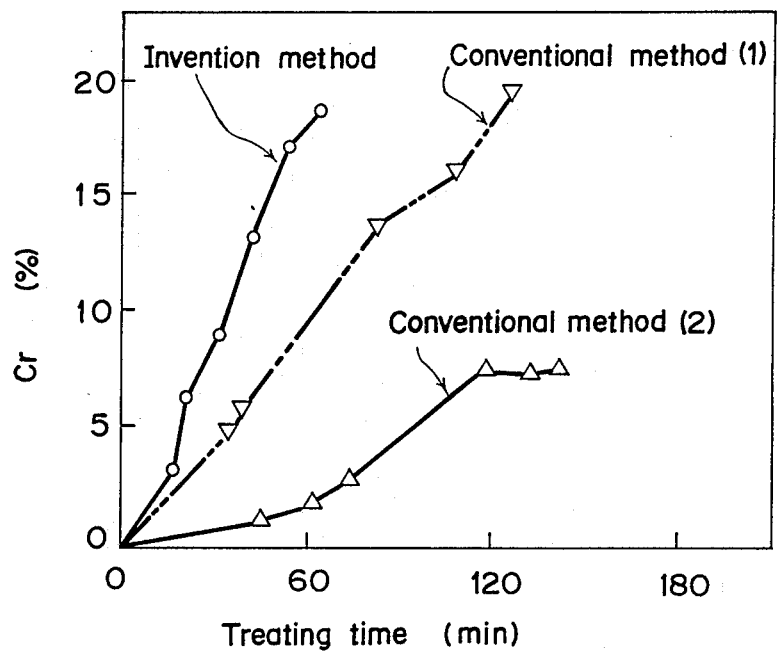
FIG_11 (a)
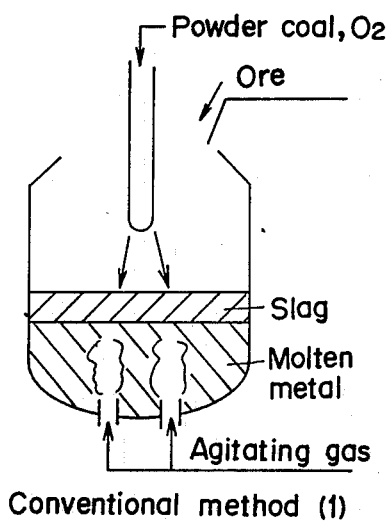
Conventional method (1)
FIG_11 (b)
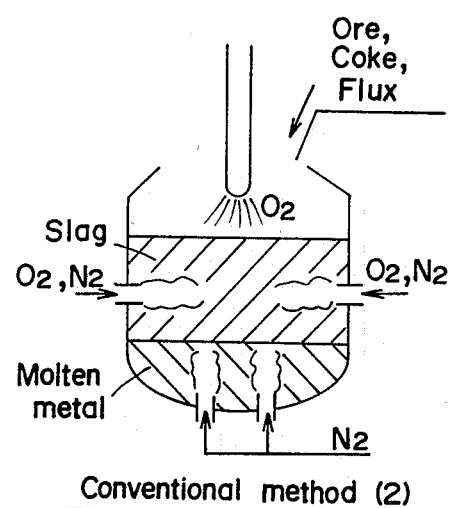
Conventional method (2)

FIG_12
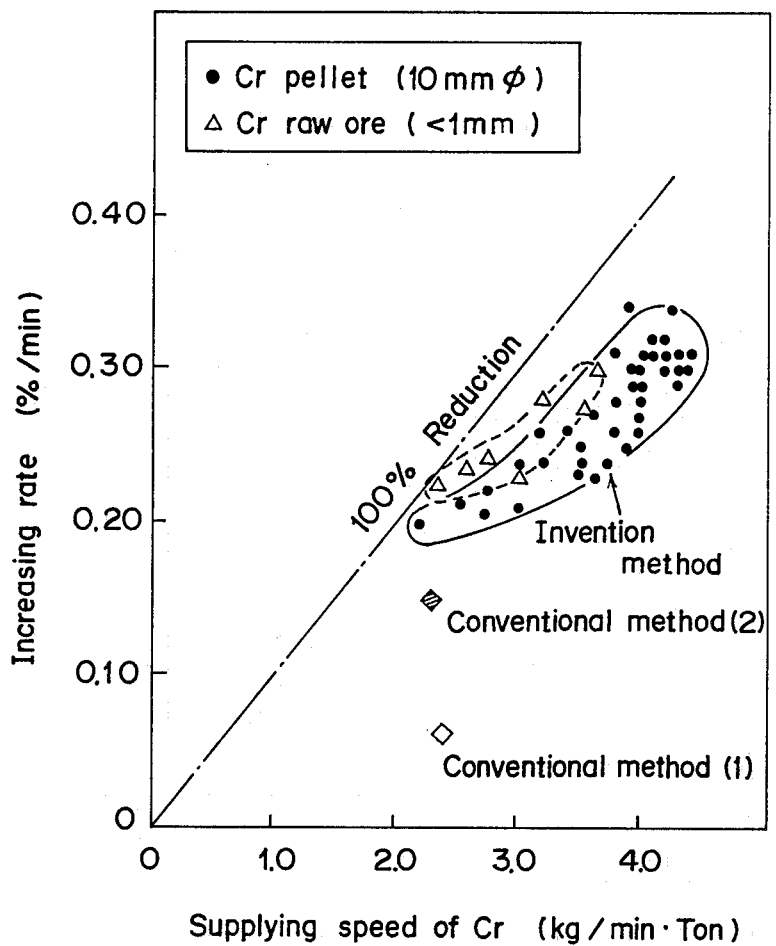

FIG_13
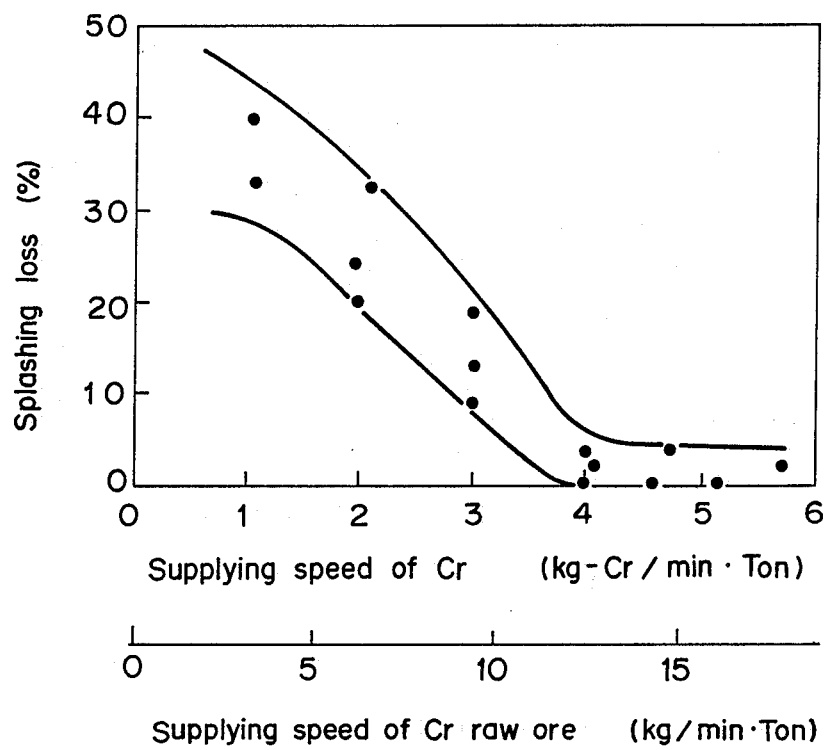
FIG_18
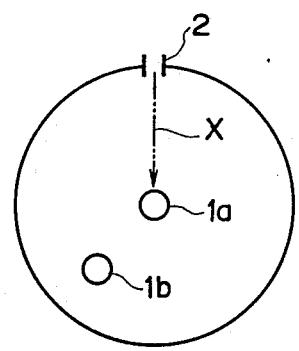
FIG_20
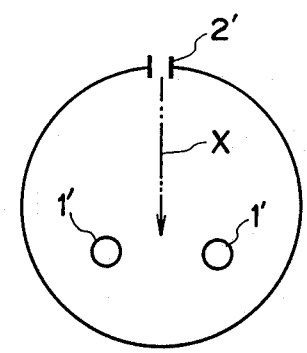

FIG_14
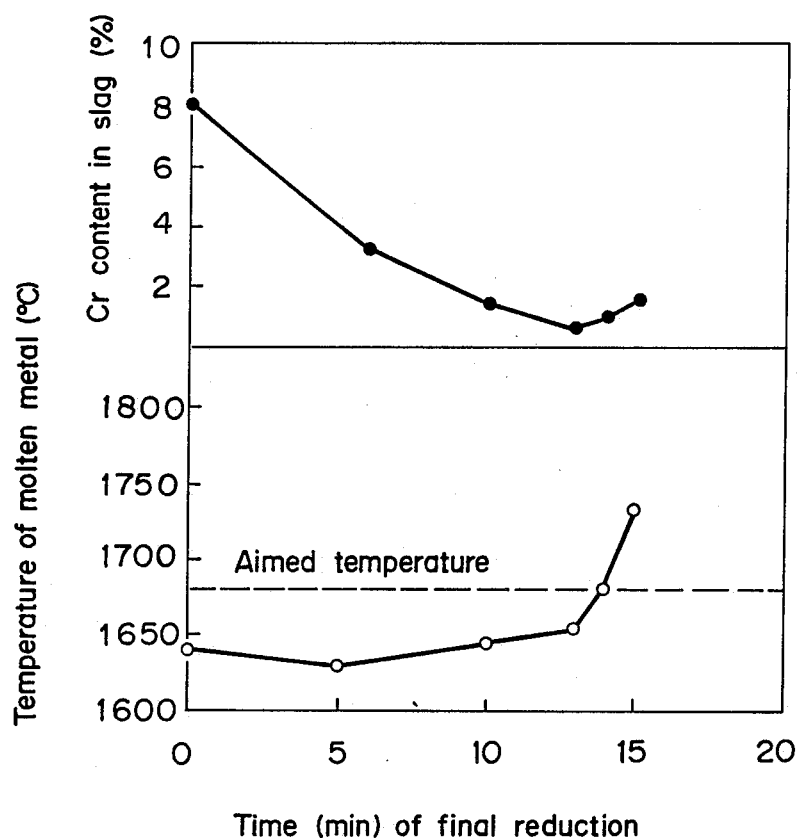

FIG_15
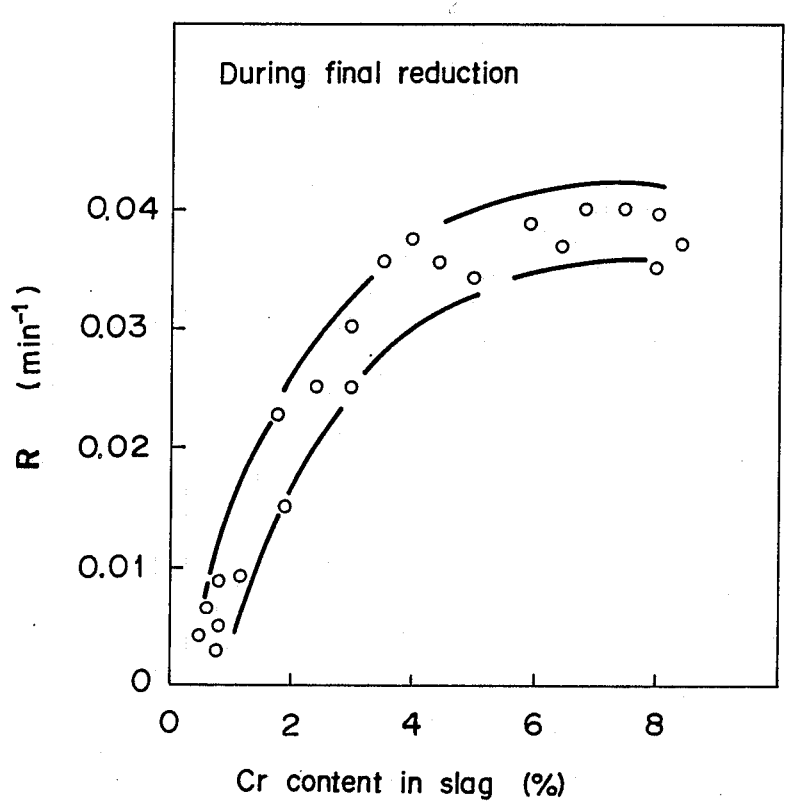

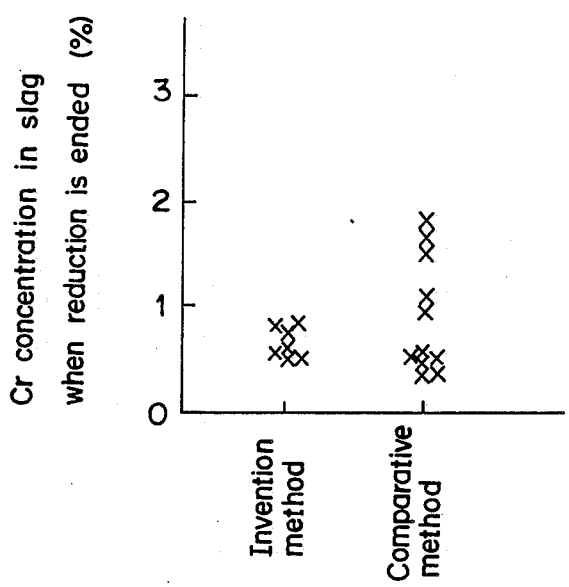
FIG_16
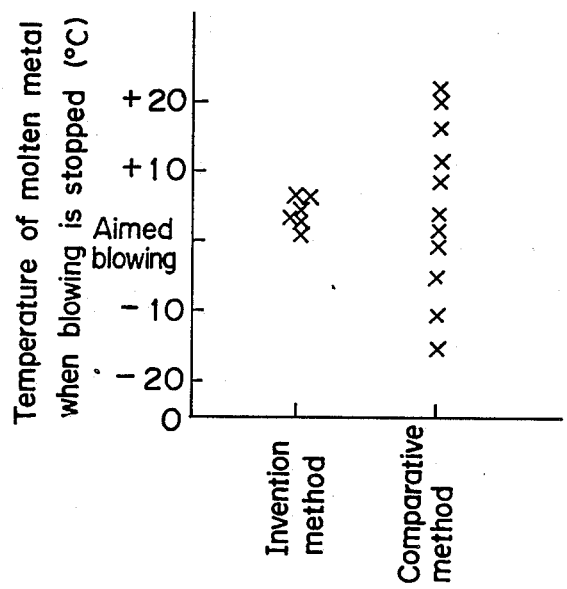
FIG_17

FIG_19
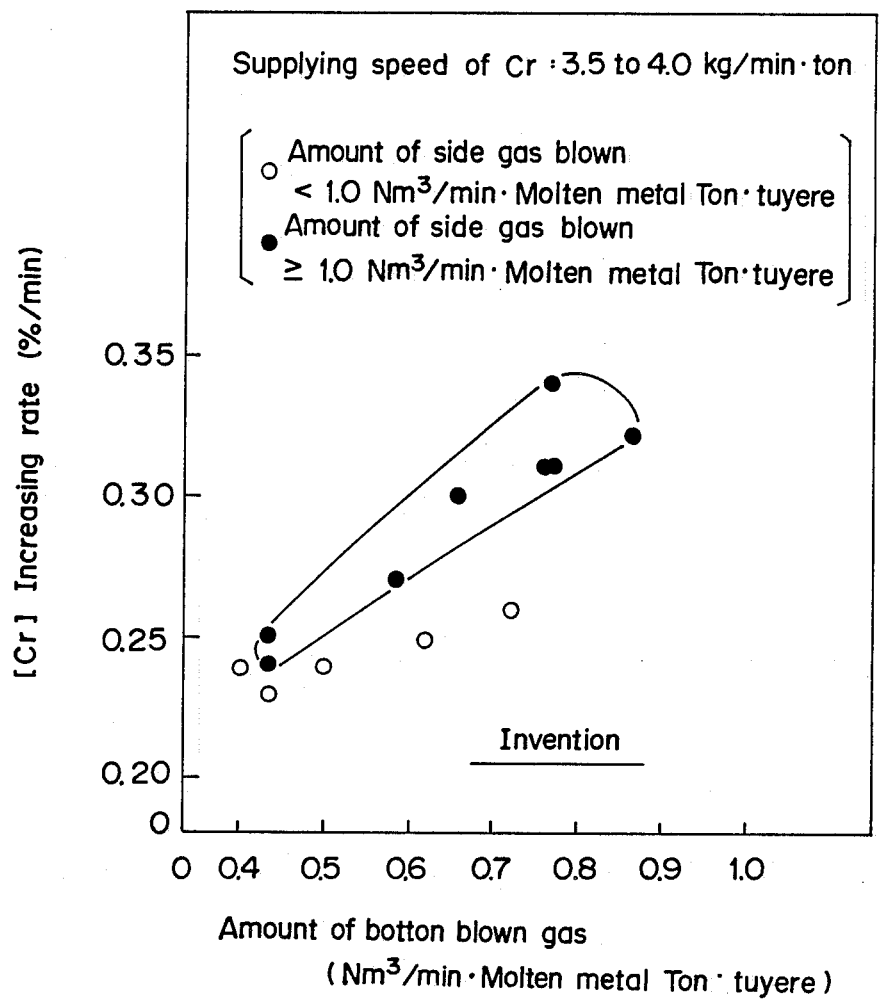

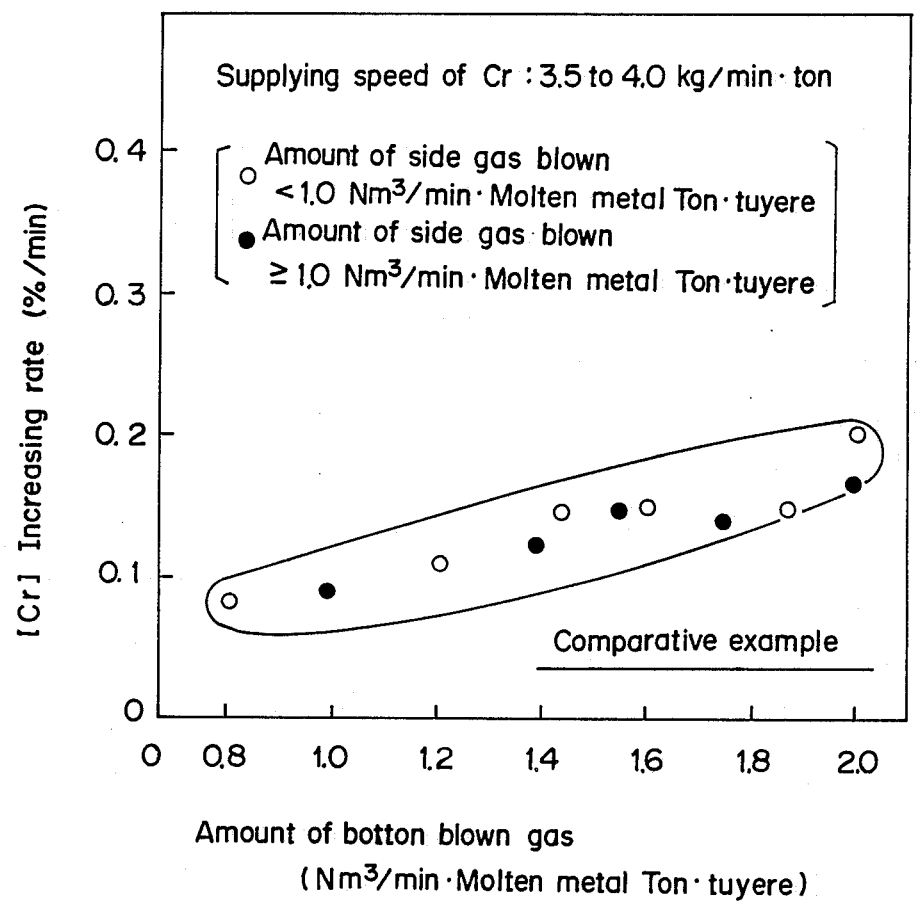
FIG_21

METHOD OF SMELTING REDUCTION OF CHROMIUM RAW MATERIALS AND A SMELTING REDUCTION FURNACE THEREOF

TECHNICAL FIELD

This invention relates to a method of smelting reduction of Cr raw materials such as Cr ores or Cr ore pellets.

BACKGROUND OF THE INVENTION

High Cr steel like stainless steel has been conventionally produced using ferrochromium as raw material. In view of saving energy and securing low production cost, smelting reduction process has been recently considered as being potentially attractive. This process produces high Cr molten metal directly using Cr raw ores (explanation will refer to "Cr ore" as an example hereinafter). In the smelting reduction method, Cr ores, carbonaceous materials and others are supplied into a reduction furnace for directly obtaining high Cr molten metal.

For the smelting reduction method, there have been several proposals hitherto. One, proposal blows respectively $O_2$ from bottom tuyeres and $N_2$ from side blowing tuyeres at the same time as blowing $O_2$ from a top lance. Another proposal blows respectively $O_2$ from the bottom tuyeres and $O_2$ and $N_2$ from the side blowing tuyeres at the same time as blowing $O_2$ from the top lance. The latter is disclosed in, for example, Japanese Patent Application Laid-Open No. 61-279,608 (1986).

However, each of the above mentioned methods has many problems in that the Cr reduction speed is low and treatments take considerable time. With respect to the background of the prior art, the following drawbacks are known.

1. The workers in the art believed that reduction of Cr ore progresses by action of C in carbonaceous materials after Cr ore had been molten in the slag, and the melting of Cr ore is assumed to determine Cr reduction. Therefore, important technical interests for shortening the treating time were focused on specifying of the slag composition. But Cr ore is inherently less to be molten, and it is limited to speed up the reduction by accelerating the melting of Cr ore.

2. For accelerating the melting speed of Cr ore in the slag and the reduction speed, it has been considered to make a post combustion of CO gas in the furnace and utilize the heat thereby. An existing method has been adopted, which blew $O_2$ for the post combustion from a furnace upper part. If the post combustion ratio was increased, the temperature of an exhaust gas went up, but there was no technique which efficiently transmitted a sensitive heat of the exhaust gas to the molten metal, and as a result, heat transfer efficiency was lowered and the exhaust gas at high temperature was removed inevitably. The heated exhaust gas considerably damaged the wall refractories and those of an exhaust gas feed. Therefore, in general it has been considered that the post secondary combustion ratio could not be heightened very much.

For dealing with the above stated problems of the prior art, the inventors made studies on the mechanisms of the smelting reduction and the decarburization, and the actual measures therefor, and subsequently they found following facts.

(1) As having been said above, it was assumed that Cr ore was reduced by the carbonaceous materials staying in the slag after Cr ore was molten in the slag, but it has been found that almost all of the actual reductions were made by actions of C in the molten metal beneath the slag as the reducing material. Therefore, the reduction speed was determined by contacting of the molten metal to Cr ore heated at the high temperature not by melting of Cr ore into the slag, so that the reduction speed could be effectively heightened by positively contacting of the molten metal to the ores.

(2) It was a basic concept in the prior art that the post combustion which is combustion of $CO_2$ generated by reduction of carbon in the ore increased in view of the technical limit with respect to increasing of the heat transfer efficiency and consumption of the refractories. If $O_2$ was blown so that the post combustion was mainly caused in the slag to forcibly agitate the slag, the heat transfer efficiency could be heightened-effectively. Thus, by the high post combustion and the high heat transfer efficiency, the temperatures of the slag and Cr ore in the slag were heightened, and the reduction speed of Cr ore by C (in the molten metal) expressed by the following formula, may be raised effectively

$$Cr_2O_3 + 3C = 2Cr + 3CO.$$

(3) In the prior art foregoing technique sometimes carried out the bottom blowing of $O_2$ in a certain period or in a full term, but such blowing was harmful to the post combustion. That is, if $O_2$ was blown from the bottom, CO gas was generated in the molten metal and agitated the molten metal compulsively, and splashes of the molten metal reached the region of the post combustion, and since C reacted with $O_2$ or $CO_2$ and generated CO, the post combustion was hindered. Therefore the bottom blowing had to be avoided, irrespective of a part and the full term of the reduction period.

Cr raw ores are very fine in grain diameters, and ordinarily around 90% contain those having grain diameters of not more than 1 mm. Therefore, when Cr raw ores such as powders are charged into the reduction furnace of the converter type from a top part, the powder ores fly outside of the furnace and lose up to 30% are lost.

For avoiding the flying losses, an injection charging may be suggested, but special facilities are required independently, and the transporting pipes are easily injured by the hard Cr ores. Thus, such measures could not be adopted actually.

In view of these circumstances, Cr raw ores are formed into pellets or briquets which results in high production costs. If the ores are agglomerated, the specific surface areas of the ores are made small so that a pre-heating time is made long and the reduction speed is lowered to lengthen the treating time.

The inventors made studies also on those problems with respect to practical measures, and as a result it was found that the probability that the grains of the Cr ores are exposed in the up-flowing gas, was decreased by heightening the charging speed of the ores and the flying loss was lowered, and especially if the charging speed of Cr raw ores is determined to be more than 4 kg/min-molten metal ton per pure Cr, the flying loss could be largely decreased.

DISCLOSURE OF THE INVENTION

The present invention is based on the above stated discoveries and the following conditions, whereby the smelting reduction at high treating speed can be realized.

(a) By the combination of the bottom tuyere blowing and the side tuyere lateral blowing of the agitating gases, the molten metal is positively diffused into a region of the slag where Cr ore exists so as to accelerate the reduction of Cr ore by C in the molten metal.

(b) $O_2$ for the post combustion is blown independently of decarburizing $O_2$ for providing a post combustion which is more than a predetermined level. The post combustion $O_2$ is blown into the slag from the top blowing lance for forming the post combustion region therein, and the slag is agitated compulsively by the side tuyere blowing gas, and a heat generated by the post combustion is caused to be transferred to the Cr ores.

(c) The side tuyere blowing gas and the bottom tuyere blowing gas are CO or inert gas, and $O_2$ gas is not used because of avoiding hindrance of the reduction by C in the molten metal and the post combustion by the top-blowing $O_2$ That is, the present invention employs the smelting reduction furnace which is provided with the bottom blowing tuyeres, the side blowing tuyeres and the top blowing lance, and obtains high Cr molten metal by reducing Cr raw material as Cr ores with C sources of the carbonaceous materials, blowing gas of following items (a) to (c) during the period of smelting reduction.

(a) blowing CO and/or inert gas from the bottom blowing tuyeres;

(b) blowing CO and/or inert gas from the side blowing tuyere such that at least a part of the flowing gas contacts an upheaval of the molten metal made by the gas blown from the bottom tuyere;

(c) blowing the decarburizing $O_2$ into the molten metal from the top blowing lance and $O_2$ for the post combustion into the slag concurrently.

Cr raw materials are reduced by maintaining the post combustion ratio to be more than 0.3. The post combustion ratio is specified by $(CO_2+H_2O)/(CO+CO_2+H_2+E_2O)$ which is the gas content bearing on an exhaust gas.

Depending upon the present invention as stated above, the reduction of Cr ores is accelerated positively, securing the high post combustion ratio and the heat transfer efficiency, so that the reducing speed could be largely elevated in comparison with the conventional practices, and the smelting reduction could be performed effectively in a short period. Further, since the post combustion ratio is high, a unit consumption of the carbonaceous materials may be decreased, and P and S contents in the molten metal to be produced may be lowered.

The invention proposes a method for controlling effectively the flying losses of the ores in the smelting reduction treatment. That is, in addition to the above stated conditions, the reduction of Cr raw ores is carried out by maintaining the charging speed of Cr raw ores so that into the amount of pure Cr is to be more than 4 kg/min. molten metal ton.

In the above mentioned smelting reduction, the invention proposes a method for grasping exactly the progressing conditions of the smelting reduction and ensure the blowing rapidly and appropriately.

Paying attentions to the relation that the amount of the $O_2$ source in the exhaust gas decreases in response to decreasing of the smelting reduction, a reduction accomplishing time is judged in accordance with the difference between $O_2$ source in the exhaust gas and the blown $O_2$. Practically, during the smelting reduction, the amount of flowing of exhaust gas and the concentrations of CO and $CO_2$ in the exhaust gas are measured, and the reduction R of the Cr raw material is obtained from the above measured values, following the below formula, and the time of accomplishing the smelting reduction by the reduction R of the Cr raw material, and the smelting reduction treatment is ended.

$$R = \frac{QE \times (\frac{1}{2} \times [\% CO] + [\% CO_2])/100 - F_{O_2}}{W_{ore} \times O_{ore}}$$

Herein, $W_{ore}$: the amount of charging Cr raw materials (Ton)

$O_{ore}$: the amount of $O_2$ contained in Cr raw materials ($Nm^3$/Ton)

QE: the flowing amount of the exhaust gas ($Nm^3$/Ton)

(%CO): CO concentration in the exhaust gas (%)

($\%CO_2$): $CO_2$ concentration in the exhaust gas (%)

$F_{O_2}$: the flowing amount of the blown $O_2$ ($Nm^3$/min)

As recited herein, such as in the designations $Nm^3$/ton, $Nm^3$/hr, etc, the letter N refers to "normal" and designates the normal state at 0° C. under 1 atmosphere.

Further, the invention is to provide a structure of the furnace suited to practising the smelting reduction as stated above. That is, the smelting reduction furnace of the invention has the bottom blowing tuyeres and the side blowing tuyeres, and at least one of the bottom blowing tuyeres and one of the side blowing tuyeres are arranged such that the both gas blowing lines are crossed.

The smelting reduction furnace of the invention may have a plurality of bottom blowing tuyeres and side blowing tuyeres respectively, and in this case, it is preferable that one group comprises one bottom blowing tuyere and one side blowing tuyere, and the gas blowing lines of the respective groups agree therewith.

BRIEF DESCRIPTION OF THE DRAWINGS

FIG. 1 and FIG. 2 explain schematically the principle of the smelting reduction in the invention;

FIG. 3 (a) and (b) explain preferable jetting directions of the gas from the side tuyere with respect to the bottom blowing tuyeres; FIG. 4 post combustion ratio to observed post combustion ratio with respect to the bottom blown $O_2$ of the invention method and the comparative method;

FIG. 5 shows the relation between the height of the top blowing lance and the heat transfer efficiency;

FIG. 6 shows the relation between the amount of gas blown from the side tuyere and the heat transfer efficiency;

FIG. 7 shows the relations between the post combustion in the furnace and, S content, P content in the molten metal and the unit consumption of the carbonaceous material;

FIG. 8 shows briefly the relation of Cr increasing rate with respect to the amount of the gas blown from the bottom in the invention;

FIG. 9 shows the changes as the time passes, of Cr concentration, C concentration, bath temperature, post combustion ratio, amount of oxygen sent from the lance, and amount of supplying raw materials;

FIG. 10 shows the reduction treating time of the invention in comparison with the conventional methods;

FIG. 11 (a) and (b) explain the treatments of the conventional methods (1) and (2) of FIG. 10;

FIG. 12 shows the relation between the supplying speed of pure Cr and Cr increasing rate of the invention in comparison with the conventional method;

FIG. 13 shows influences of the supplying speed of powder Cr raw material to the splashing loss;

FIG. 14 shows changes as the time passes, of the temperature of the molten metal and Cr concentration in the slag in Example 3;

FIG. 15 shows the relation between R value and Cr concentration in the slag in Example 3;

FIG. 16 shows Cr concentration in the slag when the reduction is ended in Example 3;

FIG. 17 shows the temperature of the molten metal when the blowing is ended;

FIG. 18 explains one embodiment of the smelting furnace of the invention:

FIG. 19 shows influences of the amounts of gases blown from the bottom and the side tuyeres to Cr increasing rate, when the smelting reduction was carried out in the furnace of FIG. 18;

FIG. 20 explains a furnace of the comparative example where the bottom gas blowing line and the side gas blowing line do not cross; and FIG. 21 shows influences of the amounts of gases blown from the bottom and the side tuyeres to Cr increasing rate, when the smelting reduction was carried out in the furnace of FIG. 20.

In the drawings, the reference numerals 1, 1a, 1b are the bottom blowing tuyeres, 2 is the side blowing tuyere, 3 is the top blowing lance, and (A) is the upheaving part of the molten metal.

DETAILED DESCRIPTION OF THE INVENTION

The invention will be explained in detail.

FIG. 1 and FIG. 2 show schematically the invention method.

The furnace of the converter type is mainly used for carrying out the smelting reduction of Cr raw materials as Cr ores, Cr pellets and so on. Actually, the furnace has the bottom blowing tuyeres 1, the side blowing tuyere 2 and the top blowing lance 3.

According to the invention method, Cr raw materials (explanation will refer to "Cr ore" as example hereinafter) carbonaceous materials and fluxes are supplied to a metal bath supported in the smelting reduction furnace, and the reducing treatment is performed under the following conditions.

The gases are blown from the bottom tuyere 1, the side tuyere 2 and the top lance 3 during the smelting reduction treatment Gas blowings by the bottom tuyere 1 and the lateral tuyere 2 cooperate to diffuse the molten metal into the slag and heightens the reduction speed largely.

The gas jetted from the side blowing tuyeres does not necessarily flow horizontally, and it is sufficient that the side blowing gas contacts the upheaving part (A) of the molten metal to splash or diffuse the molten metal into the slag.

Accordingly, the gas blown from the side tuyere may flow at moderately downward or upward angles.

As mentioned above, the inventors found that the reduction of Cr ore in the slag was progressed by C in the molten metal as the main reducing substance, by which the molten metal was agitated compulsively to diffuse positively into the slag (range where Cr ores float) so as to increase the reducing rate. Therefore, in the invention, the agitating gas is supplied from the bottom blowing tuyere 1 to form an upheaving part (A) on the metal surface. At the same time, the agitating gas is supplied from the side tuyere 2 so that at least one part of the gas contacts the upheaving part (A), whereby the part (A) is splashed into the slag. The apparent specific gravity of the slag is ordinarily 0.3 to 0.5, and the bulk specific gravity of the Cr ore is about 3.0. Therefore, Cr ore in the slag gather around the lower region of the slag and float there as seen in FIG. 2. If the upheaving part of the molten metal is splashed by the side blowing gas, the splashed one is diffused around the lower range of the slag where Cr ores exist as shown in FIG. 2, and C in the splashed molten metal reduces $Cr_2O_3$, and thus a high reducing speed may be obtained. For providing such effects, it is of course necessary that the agitation must be caused compulsively by blowing more gas from the both of the bottom tuyere and the side tuyere, and the amount of gas to be blown is determined in response to the amount and the depth of the molten metal. FIG. 8 shows the relationship between the amount of the gas blown ($Nm^3$/min/ton of the molten metal/one tuyere) from the bottom tuyere and Cr increasing rate in the molten metal, from which is seen that Cr increasing rate, that is, Cr reducing rate is heightened in accordance with increasing of the amount of the bottom blowing gas, and an effective reducing reaction takes place.

For obtaining such a behavior, it is preferable that the gas from the side tuyere exactly blows against the upheaving part (A) in the vertical directions and in the horizontal directions. For example, it is desirable to dispose the bottom blowing tuyere or tuyeres 1 and the side blowing tuyere or tuyeres 2 in the shown in FIGS. 3 (a) and (b). positional relation as shown in FIGS. 3 (a) and (b).

The side blowing gas also agitates the slag where the post combustion range is formed, in addition to the diffusion of the molten metal as said above, which will be referred to later.

The side blowing gas and the bottom blowing gas to be employed in the invention are limited to CO and the inert gas ($N_2$ or Ar), and $O_2$ is not used for following reasons.

If $O_2$ is used for the side blowing, it reacts with C in the molten metal splashed for reducing Cr ore, and the reduction by C in the molten metal would be hindered. In addition, if $O_2$ is used, the temperature of the refractory become high and the refractory is damaged.

Further, if $O_2$ is used for the bottom blowing, CO gas is caused in the molten metal and the molten metal is agitated exceedingly. As a result, the splash reaches the post combustion range (refer to FIG. 2), and C in the molten metal reacts with later mentioned $O_2$ for the post combustion so that the post combustion is hindered. Besides, if $O_2$ is used, a cooling gas (such as $C_3H_8$) must be added for the refractory whose temperature rises too much, so that the bottom blowing gas is increased, and splashes of the molten metal by the compulsive agitation are accelerated. FIG. 4 shows the investigations of the actually measured post combustion ratio (actually measured) to the determined combustion ratio ($PC.O_2/(CD.O_2+O_2)$ in ores)) with respect to the bottom blowing $N_2$ of the invention method and the bottom blowing $O_2$ of the comparative example, instead of $N_2$. It is seen that the post combustion is hindered by $O_2$ blown from the bottom.

CO as the agitating gas and $N_2$ and Ar as the inert gas may be used independently or in mixture.

The decarburizing $O_2$ is blown into the molten metal from the top lance 3, and concurrently $O_2$ for the post combustion is blown into the slag. The top blowing lance 3 is provided with a nozzle hole for the decarburizing $O_2$ and a nozzle hole for the post combustion $O_2$. The post combustion $O_2$ is supplied obliquely outside the flow of the decarburizing $O_2$.

In the invention, a high post combustion is provided, while the post combustion range is formed mainly within the slag. The post combustion range is thus formed in the slag, and the slag is forcibly agitated by blowing the gas from the side tuyere, whereby the high heat transfer efficiency is provided while the high post combustion is secured. Therefore, the post combustion $O_2$ must be blown into the slag such that the post combustion is formed in the slag.

Actually, it is necessary that the height of the top blowing lance is determined at an appropriate level with respect to the levels of the slag or the molten metal. That is, the nozzle hole of the top blowing lance 3 can be positioned above a slag surface or thereunder. If it were too high, the post combustion range would not be formed in the slag so that the heat transfer efficiency is lowered. Conversely, if it were too low, the post combustion range would not be formed properly, since the post combustion $O_2$ is blown into the area where Cr ores float in the slag (see FIG. 2).

FIG. 5 shows the relationship between the height of the lance nozzle from the slag surface (forming level) and the heat transfer efficiency, where if the lance is too high above the slag surface, a satisfied heat transfer efficiency cannot be obtained. FIG. 6 shows the relationship between the amount of gas blown from the side tuyere and the heat transfer efficiency, where the satisfied heat transfer can be obtained by blowing the gas from the side tuyere so as to agitate the slag forcibly.

The post combustion ratio is specified by $(CO_2+H_2O)/(CO+CO_2+H_2+H_2O)$ which is the gas content bearing on an exhausted gas. In the invention, the above mentioned reducing treatment is performed at 0.3 of the post combustion ratio. Since the high heat transfer efficiency can be effected, and if the post combustion ratio is increased as stated above, a high reduction treating ability (reducing speed) can be provided. In addition, if the post combustion ratio is increased, the addition amount of the carbonaceous materials (mainly coke) can be decreased. Consequently, the unit consumption of the carbonaceous materials may be decreased, and because almost all of the P components in the molten metal are brought by the carbonaceous materials, P in the molten metal can be lowered. If the post combustion ratio is heightened, a gaseous desulfurization takes place vigorously, and S in the molten metal is decreased, too. Also from these view points, the present invention determines the post combustion ratio to be more than 0.3. FIG. 7 shows the relationship, in the smelting reduction, between the post combustion ratio, the unit consumption of the coke, and P and S contents in the molten metal, where if the post combustion ratio is maintained to be more than 0.3, the unit consumption of the coke is controlled, and P and S are decreased appropriately.

The above mentioned matters refer to the detailed contents of the invention, and when the invention is actually practised, the following processes are dealt with of charging—slagging rising temperature—smelting reduction of Cr ores.

The charging process herein means to charge Fe sources such as the molten metal and form a metal bath in the furnace. In the slagging and rising temperature process, oxygen is supplied into the bath, and the cabonaceous materials and the flux are charged to the molten metal so as to form the slag to be a reduction region of Cr ores, and the bath temperature is raised enough for the reduction. In the smelting reduction, the Cr ores, the cabonaceous materials and the flux are supplied in succession. At the end of this process, a final reduction is carried out without supplying the Cr ore, and the reducing treatment is accomplished when the Cr concentration reaches an objective value.

EXAMPLE 1

The molten metal of 3.7 ton was charged into the smelting reduction furnace of the converter type (5 tons), and the smelting reduction was performed by supplying Cr ores, coke and flux, and 18% Cr molten metal of 5.5 ton was produced. FIG. 9 shows changings of Cr and C concentrations in the metal, bath temperature and the post combustion ratio OD, the $O_2$ supplying amount, and the raw material charging amount.

FIG. 10 shows the smelting reduction time (from starting to ending) in the present example in comparison with the treating time of the conventional practices shown in FIGS. 11 (a) and (b). The conventional practice (1) blew fine powder coal and $O_2$ from the top lance, and the agitating gas from the bottom tuyeres, and the conventional practice (2) blew $O_2$ onto the slag as blowing $N_2$ from the bottom tuyere as well as $N_2$ and $O_2$ from the side blowing tuyeres under the following conditions.

| The conventional method (1) | |
|---|---|
| Top blowing $O_2$ | 1700 Nm$^3$/Hr (Final reduction period) |
| Bottom blowing $N_2$ | 350 Nm$^3$/Hr (Final reduction period) |
| Molten metal | 10 Ton |
| Cr ore | 4600 Kg (injected from lance) |
| Carbonaceous materials | 6700 Kg (injected from lance) |
| The conventional method (2) | |
| Top blowing $O_2$ | 1000 Nm$^3$/Hr (Final reduction period) |
| Bottom blowing $N_2$ | 120 Nm$^3$/Hr (Final reduction period) |
| Side blowing $N_2$ | 350 Nm$^3$/Hr (Final reduction period) |
| Molten metal | 5 Ton |
| Cr ore (powder) | 5000 Kg (onto the slag) |
| Carbonaceous materials | 3200 Kg (onto the slag) |

FIG. 10 shows that the Cr concentration of the conventional method (2) was only about 6 to 7%, while FIG. 12 shows that the Cr concentration of the conventional method (1) reached the objective 18%, but the treatment took 120 minutes. On the other hand, according to the invention, the Cr concentration reached 18% for 60 minutes being one half of that of the conventional method (1) which shows the excellent treating function of the present invention.

FIG. 12 shows the Cr increasing speed with respect to the pure Cr supplying speed (supplying speed of Cr ore calculated as the pure Cr amount) of the invention, revealing the high Cr increasing speed in comparison with the above methods (1) and (2).

With respect to the raw materials of Cr ores, it is preferable to perform the smelting reduction as maintaining the charging speed of the pure Cr to be more than 4 kg/min-molten metal Ton (the charging speed of raw Cr ore calculated into the amount of the pure Cr). Thus, by controlling the charging speed of the pure Cr, the probability that each of the grains of the raw ores is revealed in the upflow gas is decreased so that the splash loss is largely lowered.

The post combustion $O_2$ by the top blowing lance should be blown into the slag such that the post combustion range is formed in the slag as mentioned above, but when the high charging speed of Cr raw ores is required for avoiding the splash loss of Cr raw ores, the high transfer efficiency is necessarily provided as securing the high post combustion for maintaining the high charging speed while not decreasing the temperature of the molten metal.

EXAMPLE 2

The same smelting reduction furnace as in Example 1 was used for carrying out the smelting reduction as changing the charging speed of Cr powder raw ores. In this practice, the molten metal was charged into the furnace, and thereafter Cr ores, coke and flux were charged, and the smelting reduction was performed under the following conditions, and 18% Cr molten metal of 5 ton was obtained.

| | |
|---|---|
| Top blowing decarburizing $O_2$: | 1500 Nm$^3$/Hr |
| Top blowing post combustion $O_2$: | 1100 Nm$^3$/Hr |
| The amount of the bottom blowing gas ($N_2$): | 700 Nm$^3$/Hr |
| The amount of the side blowing gas ($N_2$): | 300 Nm$^3$/Hr |

The dispersions of the grains of the charged Cr raw ores were as follows.

| +1 mm | +0.5 mm | +0.25 mm | +0.149 mm | −0.149 mm |
|---|---|---|---|---|
| 1.7% | 3.8% | 20.1% | 42.9% | 31.5% |

Total Cr contained in Cr raw ores was 30%. FIG. 13 shows the relationship between the charging speed of Cr raw ores (charging speed of pure Cr) and the loss by splashing the powder ores, and it is seen that the loss was decreased considerably by determining the charging speed of Cr raw ores (pure Cr) to be $\geq 4$ kg/min-molten metal Ton.

The smelting reduction requires that the progressing conditions of the smelting reduction is exactly grasped and the treatment is accomplished in view of stabilization of the operation and securing of the yield. Especially, if the blowing is continued after finishing (accomplishing) of the reduction of Cr ores, the temperature of the molten metal goes up 10° to 50° C./min and injures the refractories. Therefore, it is indispensible to know exactly when the reduction is finished and to end the blowing instantly. In the prior art, the time to be taken for the reduction treatment was forecasted from supplying of the Cr raw materials so that the treatment was finished when a determined time passed after the treatment started, but actually due to non-uniformity of the reducing speed, the treatment was finished too early or too late, or the temperature of the molten metal was increased, and problems were involved about the stable and economical operations.

Paying attention to that, the amount of $O_2$ source bearing on exhaust gas decreases, following the decreasing of the reduction, the inventors solved the above mentioned problems by judging the accomplishing time of the reduction based on the difference between $O_2$ source in the exhaust gas and the blown $O_2$ It was believed conventionally that the Cr ores were reduced by the carbonaceous materials existing in the slag after Cr ores have been molten. However, the inventors have ascertained that almost all of the reductions were actually caused in that C in the molten metal acted as the reducing substances.

The reduction of Cr ores B$^6$ goes by the reaction expressed by the following formula $Cr_2O_3$(in Cr ore)+3C (in the molten metal)=2Cr (in the molten metal)+3CO (the exhaust gas).

The more vigorous is the reduction, the more is the generating amount of CO. Therefore, $O_2$ source contained in CO and $CO_2$ in the exhaust gas is measured, and the extent of progressing of the reduction can be grasped by the difference in the amount of the blown $O_2$ and the amount of $O_2$ source. following formula $$Q_E \times ((\%CO \times \tfrac{1}{2} + (\%CO_2))/100 \qquad (1)$$

herein, $Q_E$: the flowing amount of the exhaust gas (Nm$^3$/min)

(%CO): the concentration of CO in the exhaust gas (%)

(%CO$_2$): the concentration of $CO_2$ in the exhaust gas (%).

As shown in the following formula (2), the difference between the thus obtained value and $O_2$ to be blown into the furnace is obtained and the rate of this value to the amount contained in the Cr raw material is obtained, the rate of reducing Cr raw material, i.e., the reduction ratio R of Cr raw material can be obtained.

$$R = \frac{Q_E \times (\tfrac{1}{2} \times [\% CO] + [\% CO_2])/100 - F_{O_2}}{W_{ore} \times O_{ore}} \qquad (2)$$

herein,

Wore: the amount of charging Cr raw material (Ton)
Oore: the amount of $O_2$ contained in Cr raw material (Nm$^3$/Ton) Fo$_2$: the following amount of the blown $O_2$ (Nm$^3$/min)

In the present method, the flowing amount of the exhaust gas and the concentrations of CO and $CO_2$ are measured, and the reduction is ended when the value of the reducing rate R of Cr raw material reaches the predetermined objective value in accordance with the above formula (2).

Actually, it can be seen that the reduction of Cr ore is almost ended in the range where R value is below 0.01 (min$^{-1}$), and therefore it is desirous to end the blowing when R is 0.005 (min$^{-1}$). Further, the reducing speed of Cr ore may be understood by observing the R value, and for example, if it is judged that the reacting speed is low and the reduction is delayed, it is possible to employ such actions as increasing the agitation gas. In addition, the temperature of the molten metal may be assumed by the R value, and it is possible to employ the action for securing the temperature of the molten metal until the blowing is accomplished.

EXAMPLE 3

A molten metal of 2.7 ton was charged into the smelting reduction furnace (5 tons), Cr ore, coke and fluxes were charged for performing the smelting reduction, and 18% Cr molten metal of 5.5 ton was obtained. In this smelting reduction, the gas blowing conditions at the finishing reduction period were as follows.

The amount of $FO_2$ sent from the lance: 1500 $Nm^3/hr$

The amount of gas ($N_2$) blow from the bottom: 750 $Nm^3/hr$

The amount of gas ($N_2$) blown from the side: 360 $Nm^3/hr$.

In the above mentioned reduction treatment, the final reduction treatment was ended by the following conditions.

(1) The invention method: the treatment was ended when the R value was below 0.005 ($min^{-1}$)

(2) The comparative method: the treating time of the finish reduction was 15 min. constant FIG. 14 shows one example of the final reduction of the comparative method where the final reduction ends at 13 min. but since the blowing for 15 minutes was carried out actually, the temperature of the molten metal rapidly goes up, and the once reduced Cr was re-oxidized.

FIG. 15 shows the relation between R value and Cr content in the slag corresponding to the former, and when R value is below 0.01, Cr content in the slag is not more than 1%.

FIGS. 16 and 17 show the concentration of Cr in the slag at ending of the reduction and the temperature of the molten metal when the blowing in the invention method and the comparative method. According to the invention, Cr in the slag is effectively reduced, and the temperature of the molten metal is almost at the objective level. Therefore, it is seen in the present invention that the finish of the reduction is exactly grasped and the blowing is stopped instantly.

On the other hand, in the comparative methods, the Cr concentration in the slag and the temperature of the molten metal when blowing it stopped are non-uniform, and the the ending of the blowing is too early or too late, and the temperature of the molten metal is decreased or increased, and the yield is lowered.

The smelting reduction furnace of the invention is, as seen in FIG. 3, one bottom blowing tuyere and two side blowing tuyeres, and at least one bottom blowing tuyere and two side blowing tuyere are disposed such that the gas blowing lines of the both cross each other.

The bottom blowing tuyere 1 and the side blowing tuyere 2 may be plural as shown in FIG. 3(b), and in this regard, one pair is made of one bottom blowing tuyere and the side blowing tuyeres, and it is preferable that the respective tuyeres are disposed such that the gas blowing line of the tuyeres of each pair agrees with.

It is important that the gas blown from the side tuyeres splashes the upheaval of the molten metal, and therefore, the positional relation, of the side blowing tuyeres and the height of the molten metal is important.

FIG. 18 illustrates one example of the invention, where the bottom blowing tuyeres 1a, 1b are provided at the center of the furnace bottom and at the outside of the center, and the side blowing tuyere 2 is disposed such that the gas blowing line X crosses with the gas blowing line of the bottom blowing tuyere 1a.

The bottom blowing tuyere may be one as seen in FIG. 3(a), but if all the gas is supplied from one bottom blowing tuyere, the gas pressure is extraordinarily high, and the gas blows through the molten metal, and a appropriate upheaving part A of the molten metal could not be often formed. Therefore, in the present example, there is provided another tuyere as a bottom blowing tuyere other than the one tuyere 1a corresponding to the side tuyere.

Such a furnace in the present example and the furnace in the comparative example where the side tuyere 2' and the bottom tuyeres 1' were used, and the the results of the smelting reduction are shown.

The molten metal of 3.7 ton was charged into the furnace, and the amount of gas blown from the bottom tuyere and the amount of gas blown from the side tuyere were variously changed under the following conditions.

Decarburizing $O_2$ from the furnace top: 1400 $Nm^3/hr$

Post combustion $O_2$ from the furnace top: 800 $Nm^3/hr$

Cr raw material:

Charging speed of Cr ore so as to result in the amount of the pure Cr) being 3.5 to 4.0 kg/min.molten metal ton Diameter of tuyere nozzle: 13 mm FIG. 19 (the furnace of this invention) and FIG. 21 (the furnace of FIG. 20) show the relations between the amount of gas blown from the furnace bottom and the amount of gas blown from the side tuyere and (Cr) increasing rate into the molten metal, and in the smelting furnace of the invention, the high (Cr) increasing rate was obtained in response to the amount of gas blown from the furnace bottom and the amount of gas blown from the side tuyere. On the other hand, in the furnace of FIG. 20, the splash of the molten metal is slightly vigorous in accompany with the increasing of the amount of gas blown from the bottom, and the (Cr) increasing rate is more or less large, but in comparison with the present invention, these factors are very low, and effects of the laterally blown gas is very little.

INDUSTRIAL APPLICATION

The present invention may produce high Cr molten metal directly from Cr ores or Cr pellets, and therefore if it is combined with the decarburization, high Cr steel such as stainless steel can be produced directly from Cr ores.

What is claimed is:

1. A method of smelting reduction of Cr containing raw materials, in a smelting reduction furnace provided with bottom blowing tuyeres, side blowing tuyeres and a top blowing lance, comprising steps of reducing Cr ores by carbonaceous materials to produce high Cr molten metal, decarburizing said high Cr molten metal in the same furnace, comprising the steps of (a) blowing CO and/or inert gas ($N_2$, Ar) from the bottom blowing tuyeres, (b) blowing CO and/or inert gas from the side blowing tuyere such that at least a part of the gas contacts an upheaval of the molten metal made by the bottom blowing gas, and (c) blowing a decarburizing $O_2$ into the molten metal from the top blowing lance and a post combustion $O_2$ into the slag concurrently, and reducing Cr by maintaining a ratio of the post combustion to be more than 0.3.

2. The method as claimed in claim 1, comprising blowing $O_2$ for decarburization and $O_2$ for the post combustion through a lance, the pit of which is positioned just above a slag surface or thereunder.

3. The method as claimed in claim 1 or 2 wherein raw ores are supplied at a speed which results in metallic cr of more than 4 kg/min. molten metal ton.

4. The method as claimed in claim 1, or 2, wherein the inert gas is selected from the group consisting of Ar, $N_2$, CO, and mixtures thereof.

5. The method as claimed in claim 1 or 2 comprising supplying the post combustion $O_2$ obliquely outside the decarburizing $O_2$ through the top blowing lance having a nozzle hole for the decarbutizing $O_2$ and a nozzle hole for the post combustion $O_2$.

6. The method as claimed in claim 1 or 2 comprising, during the smelting reduction, measuring the amount of the exhaust gas and the compositions of CO, $CO_2$ and others in the exhaust gas, obtaining a reduction R of Cr raw material from the above measured values following an under formula, judging time of accomplishing the smelting reduction by the reduction R of the Cr raw material, and ending the smelting reduction treatment $$R = \frac{QE \times (\frac{1}{2} \times [\% \text{ CO}] + [\% \text{ CO}_2])/100 - F_{O_2}}{W_{ore} \times O_{ore}}$$

herein, $W_{ore}$: the amount of charging Cr materials (Ton)

$O_{ore}$: the amount of $O_2$ contained in Cr materials (Nm$^3$/Ton)

QE: the amount of the exhaust gas (Nm$^3$/Ton)

(%CO): CO concentration in the exhaust gas (%)

(%CO$_2$): $CO_2$ concentration in the exhaust gas (%)

$F_{O_2}$: the flow amount of the blown $O_2$ (Nm$^3$/min).

* * * * *